Figure 1:
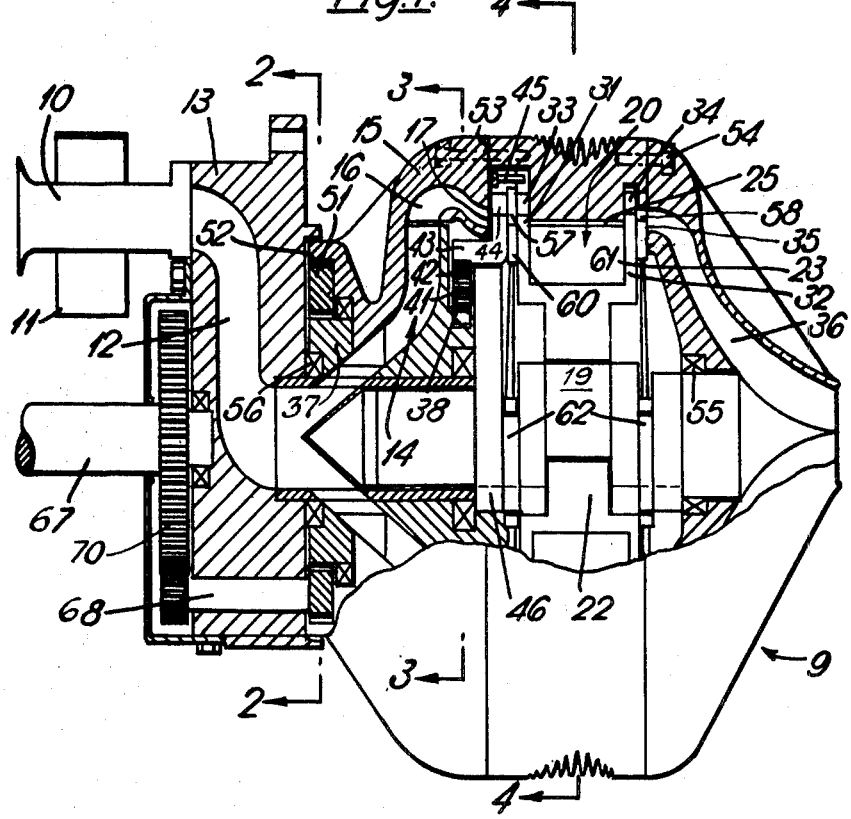

United States Patent

[11] 3,603,326

| [72] | Inventor | David Sadler Pearson |
| | | Derby, England |
| [21] | Appl. No. | 867,743 |
| [22] | Filed | Oct. 20, 1969 |
| [45] | Patented | Sept. 7, 1971 |
| [73] | Assignee | Rolls-Royce Limited |
| | | Derby, England |
| [32] | Priority | Oct. 29, 1968 |
| [33] | | Great Britain |
| [31] | | 51,284/68 |

[54] ROTARY INTERNAL COMBUSTION ENGINES
12 Claims, 6 Drawing Figs.

[52] U.S. Cl. .................................................. 123/8.41,
418/173
[51] Int. Cl. .......................................................F02b 53/08,
F01c 13/04
[50] Field of Search.......................................... 123/8.41;
418/173, 174

[56]                  References Cited
              UNITED STATES PATENTS
1,282,518  10/1918  Althause ...................... 418/173 (X)

| 2,075,561 | 3/1937 | Wellensiek ................. | 418/173 X |
| 2,511,441 | 6/1950 | Loubiere ..................... | 418/173 (X) |
| 3,329,132 | 7/1967 | Castelet ...................... | 123/8.41 (X) |
|           |        | FOREIGN PATENTS            |           |
| 633,596   | 12/1949 | Great Britain ............... | 418/173 |
| 783,913   | 10/1957 | Great Britain ............... | 418/173 |
| 1,017,381 | 1/1966  | Great Britain ............... | 418/173 |

Primary Examiner—Allan D. Herrmann
Attorney—Cushman, Darby & Cushman

ABSTRACT: A rotary internal combustion engine comprises a housing within which there is a rotor mounted for eccentric rotation with respect to the housing. The rotor has vanes the tips of which form a seal with the internal surface of the housing during its rotation. Adjacent vanes define spaces therebetween so that a combustible mixture injected into the spaces if first compressed, ignited, and then exhausted during rotation of the rotor. The housing is also rotated in the same sense at the rotor and this reduces the relative velocity between the tips of the vanes and the internal surface of the housing.

PATENTED SEP 7 1971

3,603,326

SHEET 1 OF 3

Inventor
David Sadler Pearson
By
Cushman, Darby & Cushman
Attorneys

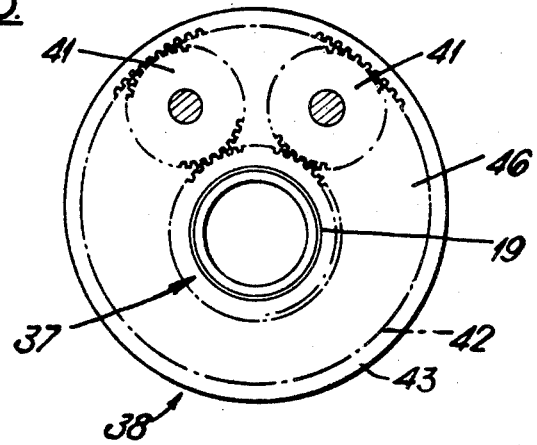
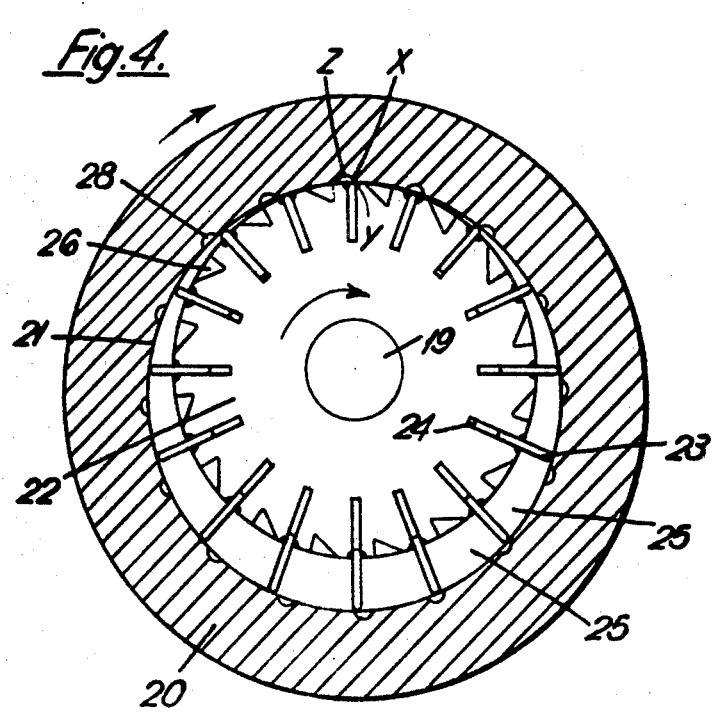

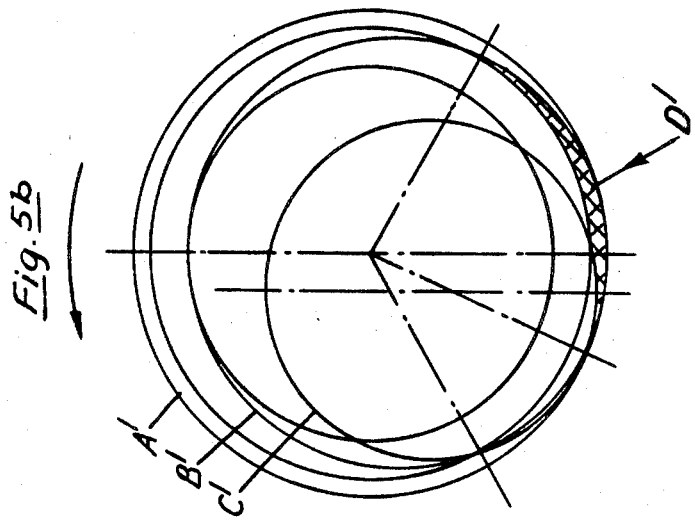
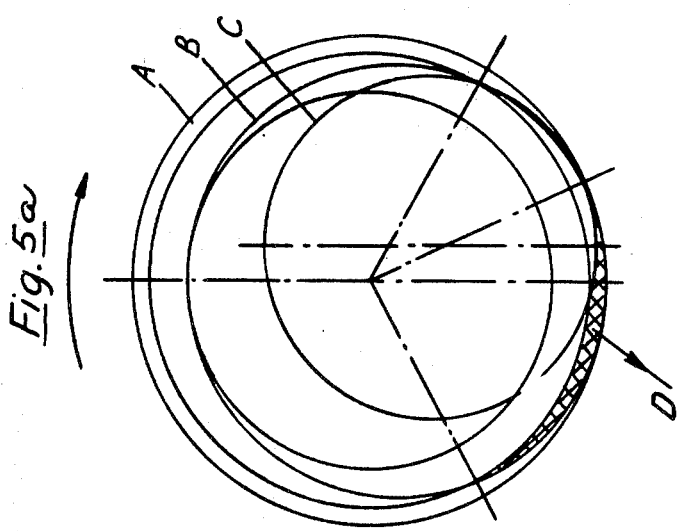

ROTARY INTERNAL COMBUSTION ENGINES

This invention concerns rotary internal combustion engines.

According to the present invention there is provided a rotary internal combustion engine comprising an housing within which there is disposed rotor means mounted for eccentric rotation with respect to said housing, said rotor means having vanes the tips of which are adapted to form a seal with the internal surface of the housing during rotation of said rotor means, adjacent vanes defining spaces therebetween whereby a combustible mixture injected into said spaces is first compressed, ignited, and then exhausted during rotation of the rotor means, and means for rotating, relative to fixed structure, the said housing in the same sense as the rotor means, so as to reduce the relative velocity between the tips of said vanes and the internal surface of said housing, and compressor means for compressing at least one constituent of the combustible mixture, said compressor means being so arranged as to contrarotate relative to said rotor means.

Preferably the rotor means includes sideplates adapted to form a seal with the housing during at least a portion of the rotation of the rotor means.

The housing may be cylindrical, said rotor means being mounted on and for rotation relative to a shaft which is stationary relative to said fixed structure, said shaft being eccentric with respect to the axis of the cylindrical housing.

Preferably the internal surface of the housing is provided with means for intermittently providing a gaseous connection between adjacent spaces between the vanes so as to cause combustion of the combustible mixture to pass from one space to the next.

Said means may comprise slots in the internal surface of the housing.

In the preferred embodiment, said compressor means is a centrifugal compressor and has a casing rigidly connected to said housing.

Inlet and outlet ports may be provided for the entry of said combustible mixture and the exhaust of combusted combustible mixture respectively, valve means being provided to open and close said inlet and outlet ports.

The valve means may comprise a valve disc or discs which rotate eccentrically relative to said housing and said rotor means.

Preferably an output shaft is connected by way of gearing means to at least one of said sideplates of the rotor means.

Additionally, said output shaft may contrarotate relative to said rotor means.

Said output shaft may be connected directly to said compressor means.

The periphery of the rotor means may be provided with slots for improving the mixing between the constituents of said combustible mixture.

Figure 2:
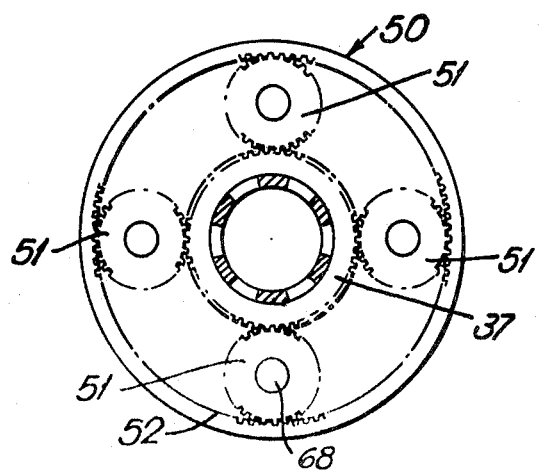

The invention is illustrated, merely by way of example, in the accompanying drawings, in which:

FIG. 1 is a view, partly in section, of an engine according to the present invention, FIG. 2 is a section taken on the line 2—2 of FIG. 1, FIG. 3 is a section taken on the line 3—3 of FIG. 1, FIG. 4 is a section taken on the line 4—4 of FIG. 1, and FIGS. 5a and 5b are diagrammatic representations of the relationship between the opening and closing of the ports and valve of an engine according to the present invention.

Referring first to FIG. 1, there is disclosed a general layout of a rotary internal combustion engine, designated generally by the reference numeral 9.

The engine 9 comprises an air intake 10, a carburetor 11 connected by way of a conduit 12, which passes through fixed structure 13, to a centrifugal compressor 14 which has a casing 15 rotatably mounted with respect to the fixed structure 13.

A compressed air/fuel mixture from the outlet of the compressor 14 passes to a conduit 16 in the casing 15 from whence it issues, by way of a casing inlet port 17, into a cylindrical housing or combustion chamber 20, having an internal chamber wall 21.

The combustion chamber 20 contains a rotor 22 (best shown in FIG. 4) which is rotatably mounted on a crankpin of a stationary eccentric crankshaft 19. The rotor 22 is provided with radially extending vanes 23 (16 of these are shown in FIG. 4, although more or less may be provided if desired). The vanes 23 are mounted in slots 24 in the rotor 22 and means, such as, for example, springs, (not shown) urge them into sealing contact with the chamber wall 21.

Thus, a plurality of combustion zones 25 are defined between adjacent vanes 23, the chamber wall 22 and the periphery of the rotor 22. The tips of the vanes 23, which are in rubbing contact with the chamber wall 21, may be provided with sealing means, although these are not shown in the drawings. The periphery of the rotor 22 is also provided with a plurality of slots 26 which are triangular in cross section. The slots 26 are provided to increase the mixing of the air/fuel mixture in the combustion zones 25.

The chamber wall 21 is also provided with a plurality of slots 28 which cause continuous ignition of the fuel/air mixture as will be described hereinafter. It will be seen that there are the same number of slots 28 as there are vanes 23, i.e. 16.

The combustion chamber 20 is rotated in the same direction as the rotor 22 either relative thereto and at the same angular speed thereas. Thus when the rotor 22 is rotating at very high speed (10–30,000 r.p.m.), the relative velocity between the tips of the vanes 23 and the chamber wall 21 does not cause undue friction or wear.

The combustion chamber 20, however, rotates on its own axis.

Referring back to FIG. 1, the rotor 22 is provided with annular flanges 31 and 32, flange 31 has an inlet port 33, therein for entry of the fuel/air mixture into the combustion chamber 20 and side flange 32 has an output port 34 for the release of the exhaust gases which pass from the combustion chamber 20 by way of a casing outlet port 35 and an exhaust duct 36, and so to atmosphere. It is through the flange 31 that power is transmitted to a power takeoff or output gear 37 by means of transfer gearing 38, best shown in FIG. 3.

Referring to FIG. 3, there are two or more idler gears 41, symmetrically disposed about the top dead center position of the engine 9, these idler gears mating with a gear track 42 on a flange 43.

The flange 43 has an inlet port 44 therethrough and is connected by bolts 45 to the sideplate 31 of the rotor 22. The inlet ports 33 and 44 are in axial alignment with each other. The idler gears 41 are fixed to an eccentric wheel 46 which rotates about the crankshaft 19. The idler gears 41 drive, in turn, an output gear 37. Thus the power from the rotor 22 is transferred via the flange 43, idler gears 41 to the output gear 37. The diameter of the output gear 37 is half that of the gear track 42, thus the output shaft has a rotational speed twice that of the rotor 32 and in opposite direction thereto.

The centrifugal compressor 14 which is directly connected to the output gear thus rotates at twice the angular speed of the rotor 22 and in the opposite direction, thus the relative angular speed of the compressor relative to the rotor is three times that of the rotor, relative to, for example, fixed structure 13.

Referring to FIG. 3, the casing 15 is driven from the output gear 37 by gearing 50. Gearing 50 comprises four idler gears 51 disposed symmetrically about the gear 37. An output shaft 67 is driven from one of the idler gears 51 by way of a shaft 68 and a gear 70 connected to the output shaft 67. The idler gears 51 are connected to the fixed structure 13, and run in a gear track 52 connected to the compressor casing 15. Since the diameter of the output gear 37 is half that of the gear track 52 the compressor casing 15 rotates at the same angular speed and in the same direction as the rotor 22.

The compressor casing 15 is connected to the combustion chamber 20 by bolts 53 and the combustion chamber 20 is connected to the exhaust duct 36 by way of bolts 54. Thus the wall 21 of the combustion chamber rotates at the same angular speed as the rotor 22.

A bearing 55 is mounted between the crankshaft 19 and the adjacent part of the casing 15, and a bearing 56 is mounted between fixed structure 13 and the output gear 37. The provision of more bearings, not shown, and lubrication means, also not shown, may be provided on the engine 9.

In addition to the inlet ports 33, 44, and casing inlet port 17, outlet port 34 and casing outlet port 35 valve ports 57 and 58 are defined by movement of two valve discs 60 and 61 respectively. The valve discs 60 and 61 are disposed adjacent to and parallel with the flanges 31, 32, of the rotor 22. Each valve disc is rigidly connected to wheel 62 both of which, in turn, are connected to and rotate with the eccentric wheel 46 about the crankshaft 19. The eccentric wheel 62 is such that the valve discs do not rotate with the same eccentricity as the rotor 22. The operation of the valve discs 60 and 61 will be described hereinafter.

Initially the operation of the engine 9 will be described with reference to FIG. 4. Although the rotor 22 is rotating at the same angular speed as the combustion chamber 20, it will be appreciated that, due to their eccentricity and their different diameters, the tips of the vanes 23 are not stationary with respect to the chamber wall 21, and the following sequence can be arranged to take place to ensure continuous ignition of the engine.

Consider point X on the chamber wall 21 and the point Y on the vane tip, both lie concurrent and on a radius at the top dead center maximum compression position. On rotation of both components at the same angular speed, point X will lead the point Y. Consider a slot 28, Z, initially in the combustion space 25 and lagging the point Y. It can be arranged, i.e. by the eccentricity and spacing of the vanes 23 and the slots 28, that the slot Z and the point Y will coincide after a certain amount of movement of the rotor 22. At this point "flash back" will occur from the combustion zone 25 immediately leading the point Y to that immediately following and containing, as yet, unburnt fuel/air mixture. After "flash back," Y continues to lead slot Z and the slot Z is now located in the combustion zone 25 immediately leading point Y. When rotation of the vane point Y and point X through 90° has occurred, the relative motion of points X and Y is zero momentarily, and the direction of relative motion is reversed. At a further point, that is the exhaust position, point Y and slot Z again coincide.

After rotation through 180° the points X and Y are again concurrent and slot Z lies in its original position relative to both.

It will be appreciated that the fuel/air mixture is admitted at the bottom dead center position, combustion occurs just before the top dead center position (for clockwise rotation), the movement of the rotor causing compression of the fuel/air mixture and their movement may be though of as being the "compression stroke," and the movement of the rotor between the top dead center position and the bottom dead center position causing expansion of the combusted fuel/air mixture and this movement may be thought of as being the "expansion stroke.".

Throughout the "compression stroke," the relative movement between the point X and the point Y is completely reversed with point X lagging Y throughout. Thus, the slot Z and the vane tip, point Y, never coincide on the compression stroke, so there is no decompression by way of the slot Z.

The provision of the centrifugal compressor 14 is to in effect, "supercharge" the engine, and by arranging the compressor to contrarotate relative to the combustion chamber 20 and at twice the angular speed thereof, results in an increased pressure ratio which, in the case of elative rotation, the order of 30,000 r.p.m., is in the order of 5.

However, it is necessary that the inlet ports 33, 44 and valve port 57 open in the correct sequence relative to casing inlet port 17 and that outlet port 34 and valve port 58 open in the correct sequence relative to casing outlet port 35. It is preferred that the "expansion stroke" continues until 10° before bottom dead center position, and thus the inlet and outlet ports must remain closed from 60° to 10° before the bottom dead center position. The valve discs 60 and 61, being eccentric to both the combustion chamber 20 and the rotor 22 achieve this. Reference to FIGS. 5a and 5b respectively shows the arrangement of opening and closing of the casing inlet port 17 and the casing outlet port 35. Circles A and A' defines the area swept by inlet ports 33 and 44, and outlet port 34 respectively circles B and B' defines the area swept by the rotor 22, and circles C and C' the area swept by the valve ports 57, 58, respectively. Thus the cross-hatched areas D and D' are places where the inlet and outlet ports are in communication with fuel/air mixture and wit the exhaust duct 36 respectively. It will be appreciated that such an arrangement will provide for some scavenging of the exhaust gases by the incoming fuel/air mixture.

Initially ignition of the engine may be provided by some form of igniter (not shown) on the chamber wall 21, i.e. contained within the engine 9. It will be necessary to convey the necessary power to such an igniter and this could be done by means of a commutator, also not shown.

In addition the combustion chamber 20 may be provided with conduits, not shown, for the passage of cooling fluid therethrough to cool the engine 9. Although it will be appreciated that some cooling will be effected purely by the interchange between the hot exhaust gases and the unburnt fuel/air mixture, in the adjacent combustion zone 25.

In order to prevent bending or locking of the vanes 23, the flanges 31 and 32 may be grooved (not shown) to receive the ends of the vanes and to provide a radial support for those parts of the vanes which project beyond the periphery of the rotor 22.

The engine described above is, due to its providing torque at low speeds, suitable for use in an automobile or lorry.

I claim:

1. A rotary internal combustion engine comprising an housing, rotor means disposed within the housing and mounted for eccentric rotation with respect thereto, vanes on said rotor means said vanes having tips of which are adapted to form a seal with the internal surface of the housing during rotation of said rotor means, adjacent vanes defining spaces therebetween whereby a combustible mixture injected into said spaces is first compressed, ignited, and then exhausted during rotation of the rotor means, fixed structure, and means for rotating, relative to said fixed structure, the said housing in the same sense as the rotor means, so as to reduce the relative velocity between the tips of said vanes and the internal surface of said housing, and compressor means for compressing at least one constituent of the combustible mixture, said compressor means being so arranged as to contrarotate relative to said rotor means.

2. A rotary internal combustion engine as claimed in claim 1 in which the rotor means includes flanges adapted to form a seal with the housing during at least a portion of the rotation of the rotor means.

3. A rotary internal combustion engine as claimed in claim 2 in which an output shaft is connected by way of gearing means to at least one of said flanges of the rotor means.

4. A rotary internal combustion engine as claimed in claim 3 in which said output shaft contrarotates relative to said rotor means.

5. A rotary internal combustion engine as claimed in claim 4 in which said output shaft is connected directly to said compressor means.

6. A rotary internal combustion engine as claimed in claim 1 in which the periphery of the rotor means is provided with slots for improving the mixing between the constituents of said combustible mixture.

7. A rotary internal combustion engine as claimed in claim 1 in which the housing is cylindrical, said rotor means being mounted on and for rotation relative to a shaft which is stationary relative to said fixed structure, said shaft being eccentric with respect to the axis of the cylindrical housing.

8. A rotary internal combustion engine as claimed in claim 1 in which the internal surface of the housing is provided with means for intermittently providing a gaseous connection between adjacent spaces between the vanes so as to cause combustion of the combustible mixture to pass from one space to the next.

9. A rotary internal combustion engine as claimed in claim 8 in which said means comprise slots in the internal surface of the housing.

10. A rotary internal combustion engine as claimed in claim 1 in which said compressor means is a centrifugal compressor and has a casing rigidly connected to said housing.

11. A rotary internal combustion engine as claimed in claim 1 in which inlet and outlet ports are provided for the entry of said combustible mixture and the exhaust of combusted combustible mixture respectively, valve means being provided to open and close said inlet and outlet ports.

12. A rotary internal combustion engine as claimed in claim 11 in which the valve means comprise a valve disc or discs which rotate eccentrically relative to said housing and said rotor means.